Feb. 2, 1971   W. C. CARLTON   3,560,128
SHUTTLECOCK AND METHOD OF MAKING THE SAME
Filed April 4, 1968   2 Sheets-Sheet 1
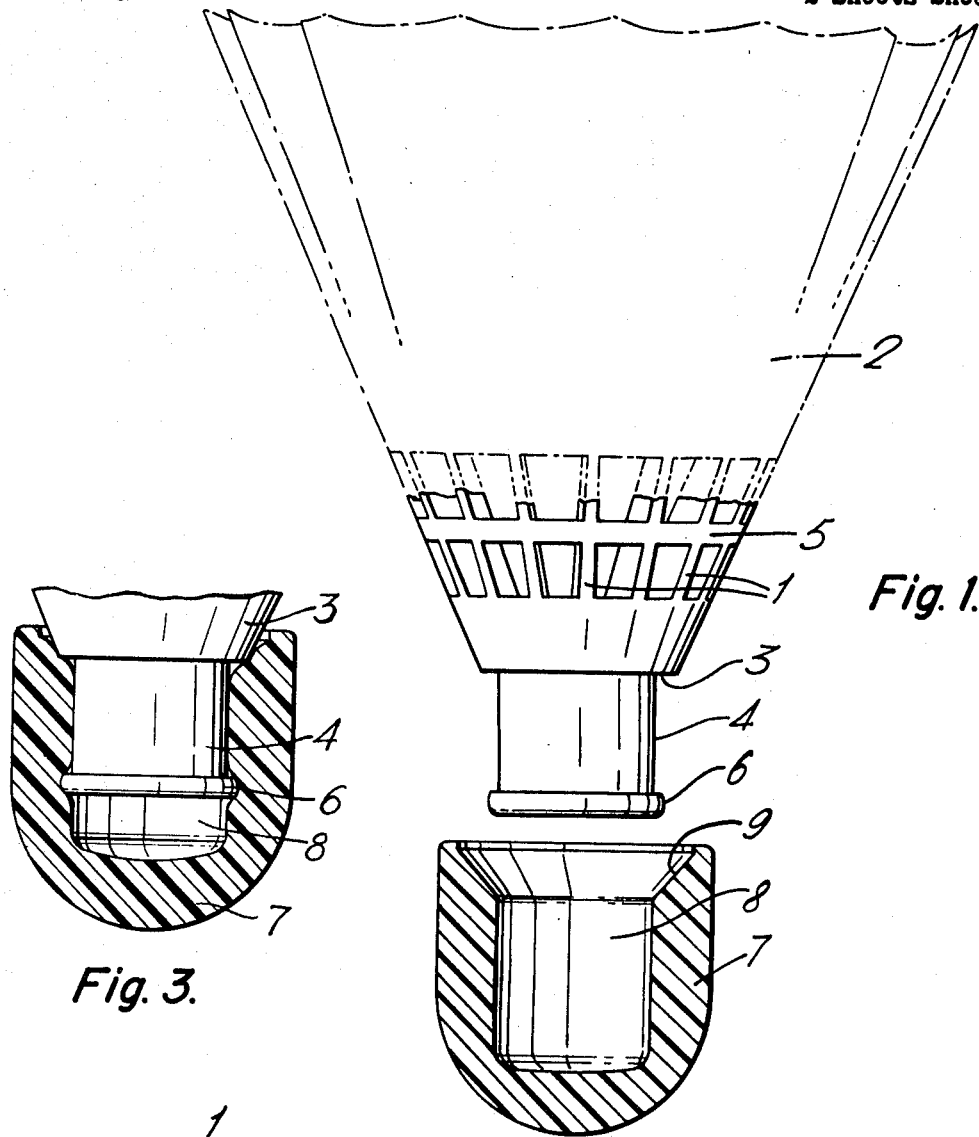
Fig. 1.
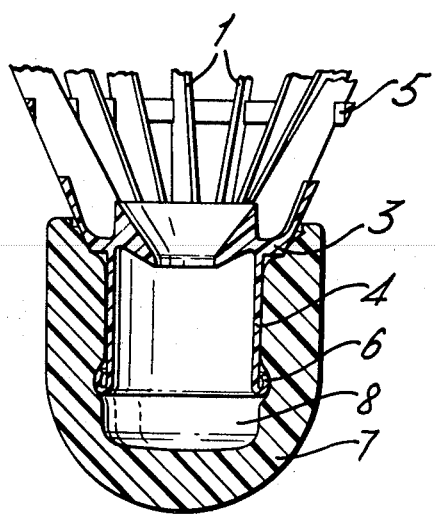
Fig. 2.
Fig. 3.
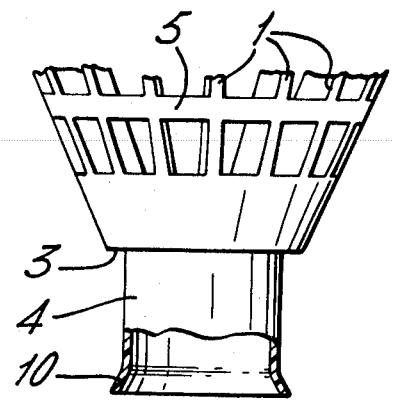
Fig. 4.

Fig. 5.

```
MOULDING FROM NYLON OR THE LIKE A
UNITARY ASSEMBLY OF A SKIRT STRUCTURE,
A FLARED ARRAY OF STEMS, A VANE AREA,
AN END RING SECURED TO THE SMALLER END
OF THE FLARED STRUCTURE, AND A STEM-EX-
TENSION COLLAR SECURED AT ONE END
TO THE END RING
```
↓
```
FORMING ON THE OUTER END OF THE
STEM-EXTENSION COLLAR A CIRCULAR EN-
LARGEMENT OR RIM
```
↓
```
SLIPPING A PLASTIC STRIKING CAP HAV-
ING AN INHERENT PROPERTY OF SHRINK-
AGE OVER THE OUTER END OF THE STEM-
EXTENSION COLLAR
```
↓
```
PERMITTING THE STRIKING CAP TO SHRINK
UNTIL IT IS SECURED TO THE STEM-EXTEN-
SION COLLAR YET IS CAPABLE OF BEING
TURNED OR SPUN ON ITS AXIS
```

INVENTOR
WILLIAM CHARLES CARLTON,

BY
ATTORNEY

United States Patent Office 3,560,128
Patented Feb. 2, 1971

3,560,128
SHUTTLECOCK AND METHOD OF MAKING THE SAME
William Charles Carlton, Fitches, Finchingfield, England, assignor to Carlton Sports Company Limited, London, England
Continuation-in-part of application Ser. No. 496,890, Oct. 18, 1965. This application Apr. 4, 1968, Ser. No. 725,555
Claims priority, application Great Britain, Nov. 6, 1964, 45,276/64
Int. Cl. A63b 67/18
U.S. Cl. 273—106        5 Claims

ABSTRACT OF THE DISCLOSURE

A shuttlecock having a flexible skirt including a flared array of stems, a vane area and a stem-extension collar, is moulded from nylon, the assembly forming a one-piece structure. The stem-extension collar is cylindrical but a curled or straight annular flange, rim or enlargement is formed on its outer end, either in the mould or preferably, after removal therefrom. A striking cap made of expanded polyvinyl chloride is slipped over the outer end of the stem-extension collar. The cap then starts to shrink and as a result of this shrinkage a groove is formed on the inner walls of the cap, the annular flange, rim or enlargement then fitting snugly in said groove and locking the cap against any rectilinear movement or removal. But the cap may be rotated on its axis, hence though firmly secured is not rigidly mounted. This spin-ability of the cap is an advantageous feature when playing badminton.

---

This application is a continuation-in-part of my copending application Ser. No. 496,890 filed Oct. 18, 1965, now abandoned.

The invention relates to shuttlecocks and to an improved method of making the same.

Over many years shuttlecocks have been made of feathers set into a substantially hemispherical striking cap made of cork or other suitable material. However, such shuttlecocks are expensive to manufacture and are fragile; hence many attempts have been made to use synthetic materials in place of the feathers. Thus in recent years shuttlecocks have been made which include a skirt of moulded plastic secured to a striking cap. However, manufacturing difficulties have arisen when employing cork striking caps with moulded plastic skirts and consequently attempts have been made to employ synthetic materials for the striking caps. One example is found in British Pat. No. 887,172 published Jan. 17, 1962. A patent showing the use of feathers, plastic and cork for making shuttlecocks is that of Miller No. 2,666,643 dated Jan. 19, 1954.

I have found that substantial advantages result from the use of expanded polyvinyl chloride in making the striking caps. Expanded polyvinyl chloride caps having a suitable mass and resilience and have surface characteristics which are appropriate to such caps to provide the desired feel and grip. But what is of equal importance, the caps of my invention, while securely held upon the stem-extension collars which project from the skirt structure, are turnable, that is, they spin when struck a glancing blow by a racket.

An object of this invention is to provide a shuttlecock having a moulded skirt structure, a striking cap made of an expanded plastics material, and improved means whereby the cap is secured, but not made rigid, on the stem-extension collar which projects from the skirt structure.

According to one feature of the invention, a shuttlecock is provided which has a moulded skirt structure with a flared array of stems, a vane area at the wider end of said flared array, and a steam-extension collar at the narrower end. The stem-extension collar has a curled flange, rim or enlargement at its outer end providing an area of enlarged outside dimensions. A striking cap made of expanded polyvinyl chloride having the inherent property of shrinkage is placed over the stem-extension collar and after shrinkage takes place is secured against removal, but may turn on the axis of the stem-extension collar.

According to another feature of the invention, a method of manufacturing a shuttlecock entirely from plastics is provided. A unitary assembly consisting of a flared skirt structure including an array of stems with a vane area, and a stem-extension collar, is moulded from nylon. The stem-extension collar is initially cylindrical but a curled flange, rim or enlargement is formed on its outer end so that said end has substantially greater outside dimensions than the remainder of the collar. A striking cap made of expanded polyvinyl chloride which is inherently capable of undergoing substantial shrinkage is slipped over the enlarged end of the stem-extension collar so that it envelopes said collar, and the cap is then allowed to shrink so as to be secured to the collar without adhesives or attaching means. The cap's shrinkage provides an internal groove that snugly fits the flange, rim or enlargement but permits turning of the cap on the axis of the collar.

In order that the invention may be clearly understood and practiced, it will now be more fully described with reference to the accompanying drawings, in which:

FIG. 1 shows on an enlarged scale a shuttlecock made in accordance with one embodiment of the invention, the skirt of the shuttlecock being shown principally in dotted lines, the striking cap being shown in section and separated from the remainder of the shuttlecock.

FIG. 2 shows in section the striking cap of FIG. 1 after it has been secured to and shrunk on the stem-extension collar which is also in section, only part of the skirt being shown.

FIG. 3 is a sectional view showing the striking cap of FIGS. 1 and 2 shown mounted on the stem-extension collar, the skirt being omitted.

FIG. 4 is a sectional elevation of a modification wherein the stem-extension collar has an enlarged end, the striking cap being omitted.

FIG. 5 is a diagram of the preferred method or process of making the shuttlecock.

Referring particularly to the drawings, FIGS. 1, 2 and 3, the preferred form of shuttlecock embodying my invention comprises a moulded nylon skirt structure which includes a flared array of stems 1 which supports at its wider end a vane area 2 indicated by dotted lines in FIG. 1. There may be sixteen stems 1 and they are integral with an end ring 3. Also integral with the end ring 3 and extending therefrom is a stem-extension collar 4 which when first formed in the mould is cylindrical in shape. One or more circular strengthening ribs 5 interconnect the stems 1. The vane area, stems, end ring, stem-extension collar and strengthening ribs are all formed in one operation in a mould, and the preferred material is nylon, because of its strength, resistance to blows or shocks, lightness, durability and pleasing appearance. The overall length of the nylon structure so far described may be approximately 2⅞ in. or 7 cm.

As shown, the stem-extension collar 4 is a straight hollow tube which may be approximately 1 cm. in length and which has an outer diameter less than the outer diameter of the end ring 3. The end of the stem-extension collar 4 that is remote from the end ring 3 is rolled over outwardly to form a curled flange, rim or enlargement 6 which as viewed from the end is ringlike and has no sharp edges. Desirably this rolling over takes place after the nylon structure has been removed from its mould. However, the flange or rim 6 could be formed in the mould. By way of example the outer diameter of the cylindrical part of the stem-extension collar 4 may be 1.3 cm. and the outside diameter of the rim 6 may be 1.7 cm.

The shuttlecock of my invention also comprises a striking cap 7 of expanded polyvinyl chloride or of any other expanded plastics material having similar properties. The striking cap is initially formed as shown in FIG. 1, being cuplike and having an internal cylindrical surface 8 which is unbroken, that is, has no groove or recess. It also has a chamfered surface 9 at the end which is to be slipped over the end of the stem-extension collar, the surface 9 then acting as a guide. When the parts have been assembled the shuttlecock is then put aside for a suitable time, say two or three weeks, and during this period the expanded polyvinyl chloride cap 7 shrinks, which causes the cap to fit snugly around the cylindrical walls of the stem-extension collar, and very closely around the curled rim 6, so that as shown in FIG. 3 a groove is automatically formed in the cap to receive the rim and lock the cap against rectilinear movement or withdrawal from the stem-extension collar. No adhesive or other fastening means is necessary.

While the shrinkage continues for a period of several weeks, and the striking cap is thereby very firmly secured to the stem-extension collar and hence to the skirt structure, the connection between these parts is not rigid: the cap may be turned by the fingers or rotated on the axis of the stem-extension collar. This relative movement permitted by the described construction is of importance when the shuttlecock is struck a glancing blow by a badminton racket. With a glancing blow on the cap, the latter turns and this reduces the amount of spin which can be imparted to the shuttlecock. Spin is not an advantage in a shuttlecock as it causes the shuttlecock to fly in a very close and unpredictable curve. But if the striking cap spins this lessens the spin of the shuttlecock. The effect is aerodynamic.

In the use of expanded polyvinyl chloride for the purpose described it is found that the rate of shrinkage decreases with time but is marked for about one month after manufacture of the striking caps. Hence preferably the assembly of the caps on the skirt structure takes place within one month after such manufacture.

Referring to FIG. 4, the construction is the same as the one previously described and shown except that the outer end of the stem-extension collar 4 does not have a rolled over rim (like rim 6) but has a flared or outwardly bent flange 10 which will be gripped by the striking cap (not shown) when the latter has been slipped over the end of the collar 4 and permitted to shrink for a sufficient period of time. This construction is less desirable than the earlier described embodiment because the uncurled flange 10 has a tendency to dig into the inner wall of the cap, as the parts are assembled. However, careful attention to the assembly will effect a union of the parts which will secure the striking cap to the skirt structure without use of an adhesive or a fastening element.

While the invention has been described with particular reference to two embodiments thereof shown in the drawings, the stem-extension collar may be formed in other ways so that it has substantially larger dimensions at its outer end than over the balance of its length, whereby the striking cap may be secured to the stem-extension collar by shrinkage of the cap on the collar. If preferred, the recess 8 in the striking cap may be initially formed with a shallow annular recess on the inner wall (not shown) for locating the parts by receiving the enlarged rim 6 of the stem-extension collar during assembly. Then shrinkage takes place to secure the parts against any possible separation during use. Other changes and modifications in the construction and method of manufacture may be made within the scope of the following claims.

What I claim is:

1. A method of making a shuttlecock comprising the steps of moulding from a plastics material a unitary assembly embodying a skirt structure including a flared array of stems and a vane area secured to the stems, an end ring united to the smaller end of the flared skirt structure, and a stem-extension collar united at one end to the end ring and having the form of a cylinder; enlarging the free end of the stem-extension collar to provide a flange or rim of substantially larger diameter than the remainder of the collar; selecting an expanded plastics material having an inherent property of substantial shrinkage, moulding said material into a striking cap having a cup-like shape, dimensioning the opening in said cap to a size slightly larger than that of said stem-extension collar, positioning said cap on said stem-extension collar by slipping it over the free enlarged end of the stem-extension collar before substantial shrinkage occurs; and maintaining said cap in position against axial removal solely by allowing the striking cap to shrink while so positioned, the shrinkage being such that the striking cap is maintained upon the stem-extension collar by its gripping of the enlarged free end of the stem-extension collar, but the fit thereon is such as to permit free turning of the striking cap about the collar, when the cap is struck a glancing blow by a badminton racket.

2. The invention defined in claim 1, wherein said unitary assembly is moulded in one piece from nylon, and said striking cap is made from expanded polyvinyl chloride.

3. The invention defined in claim 1, wherein the change in the size of the free end of the stem-extension collar consists in curling said free end outwardly and backwardly to form an enlarged annular rim with no sharp edges upon which the striking cap shrinks forming a groove receiving and interlocking with said annular rim.

4. An all plastic shuttlecock comprising:
(a) a skirt structure including a flared array of stems, a vane area secured to the stems at their outwardly flared ends, an end ring secured to the stems where they are closest together, and a stem-extension collar secured at one end to the end ring and having a cylindrical form except at its outer end, which is substantially enlarged to form a ring-like flange or rim;
(b) a striking cap rotatably mounted over said stem-extension consisting of a cup-shaped body of expanded plastics material having the inherent property of substantial shrinkage with the opening therein being of a diameter slightly larger than said stem-extension when initially manufactured; the striking cap embracing the enlarged end of the stem-extension collar and being maintained thereon in said rotatable fashion solely by the change in its form induced by such shrinkage so that the cap may rotate in relation to the stem-extension collar when it is struck by a glancing blow by a badminton racket.

5. The invention defined in claim 4, wherein the all-plastic assembly is moulded in one piece from nylon, and the striking cap is composed of expanded polyvinyl chloride.

References Cited
UNITED STATES PATENTS

| 2,218,593 | 10/1940 | Ushakoff | 273—106(I) |
| 2,666,643 | 1/1954 | Miller | 273—106(I) |

FOREIGN PATENTS

| 861,649 | 2/1961 | Great Britain | 273—106(I) |
| 887,172 | 1/1962 | Great Britain | 273—106(I) |

RICHARD C. PINKHAM, Primary Examiner

P. E. SHAPIRO, Assistant Examiner

U.S. Cl. X.R.

29—443, 447